(12) United States Patent
Schmidt et al.

(10) Patent No.: US 10,389,122 B2
(45) Date of Patent: Aug. 20, 2019

(54) METHOD AND A SYSTEM FOR CONTROLLING ENERGY SUPPLY TO A CLIENT

(71) Applicant: NEC EUROPE LTD., Heidelberg (DE)

(72) Inventors: Mischa Schmidt, Heidelberg (DE); Anett Schuelke, Gaiberg (DE)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 15/549,683

(22) PCT Filed: Feb. 11, 2015

(86) PCT No.: PCT/EP2015/052845
§ 371 (c)(1),
(2) Date: Aug. 9, 2017

(87) PCT Pub. No.: WO2016/128037
PCT Pub. Date: Aug. 18, 2016

(65) Prior Publication Data
US 2018/0034272 A1    Feb. 1, 2018

(51) Int. Cl.
*H02J 3/06* (2006.01)
*G06Q 50/06* (2012.01)
*H02J 3/14* (2006.01)
*G05B 13/02* (2006.01)
*H02J 3/32* (2006.01)
*H02J 3/00* (2006.01)

(52) U.S. Cl.
CPC ............. *H02J 3/06* (2013.01); *G05B 13/026* (2013.01); *G06Q 50/06* (2013.01); *H02J 3/14* (2013.01); *H02J 3/32* (2013.01); *H02J 2003/003* (2013.01); *Y02B 70/3225* (2013.01); *Y04S 20/222* (2013.01)

(58) Field of Classification Search
None
See application file for complete search history.

(56) References Cited

U.S. PATENT DOCUMENTS

| 8,315,745 | B2* | 11/2012 | Creed | ........ | H02J 3/14 700/295 |
|---|---|---|---|---|---|
| 2009/0105888 | A1 | 4/2009 | Flohr et al. | | |
| 2011/0204720 | A1 | 8/2011 | Ruiz et al. | | |
| 2012/0065801 | A1 | 3/2012 | Rossi et al. | | |
| 2013/0024034 | A1* | 1/2013 | Iino | ........ | H02J 3/383 700/291 |
| 2013/0211612 | A1 | 8/2013 | Ahn et al. | | |
| 2014/0188295 | A1 | 7/2014 | Saito | | |

* cited by examiner

*Primary Examiner* — Ryan A Jarrett
(74) *Attorney, Agent, or Firm* — Leydig, Voit & Mayer, Ltd

(57) ABSTRACT

A method for controlling energy supply to a client, wherein the client is connected to at least two energy utilities and/or energy grids for receiving energy for operating its energy systems, includes providing a demand request signal by at least one operation unit and/or by at least one of the at least two energy utilities and/or energy grids for requesting a demand modification with regard to at least one energy system of the client. A functional entity balances the energy supply to the client, so that a supply of energy from the at least two energy utilities or energy grids to the client is provided under consideration of the demand request signal or signals in a complementary way.

20 Claims, 5 Drawing Sheets

METHOD AND A SYSTEM FOR CONTROLLING ENERGY SUPPLY TO A CLIENT

CROSS REFERENCE TO RELATED APPLICATIONS

This application is a U.S. National Stage application under 35 U.S.C. § 371 of International Application No. PCT/EP2015/052845 filed on Feb. 11, 2015. The International application was published in English on Aug. 18, 2016 as WO 2016/128037 A1 under PCT Article 21(2).

FIELD

The present invention relates to a method for controlling energy supply to a client, wherein the client is connected to at least two energy utilities or energy grids for receiving energy for operating its energy systems. Further, the present invention relates to a system for controlling energy supply to a client.

BACKGROUND

Methods and systems for controlling energy supply to a client, wherein a demand request signal is provided by an energy utility or energy grid are known from prior art. Within such known technologies energy utilities or energy grids request a reduction of energy to be provided within definable time periods, for example, for avoiding situations wherein the energy utility or energy grid is not able to provide a sufficient amount of energy.

Typically, Demand-Response, DR, technologies are one of the measures increasingly deployed to serve the challenges of future energy landscape. Today, DR is mainly applied to electricity grids. The coexistence of multiple energy grids and demands are mainly exploited passively, but not through active coordination of the given multi-modality linked to the grids. Research is ongoing in exploiting the transition between different utility grids through actual transition of energy forms.

The participation of consumers like buildings in DR programs have been so far limited, and only related to electricity grid DR approaches. In this context, the aggregation of buildings to building fleets have been considered but not widely deployed. New developments on electrical energy storage solutions, ESS,—in form of battery-ESS—allow the deployment of ESS into buildings. While this is technologically possible, e.g. http://advmicrogrid.com/#hybridelectricbuildings, this approach is still very costly and ignores the need for energy landscape evolution beyond the electricity grid.

But, it is common that buildings are connected to multiple energy and utility grids for different resources. In particular in cases where buildings can heat with multiple forms of energy, e.g. reducing gas consumption for static heating would have effects on electric air heating systems' energy consumption. It is also known that the heating/cooling effort for buildings takes a large portion of the energy consumption distribution—about 54%, source: http://www.iluvtrees.org/wp-content/uploads/2009/05/iltofficebuildingprofile.pdf—compiled by a mixture of electricity about 66% of entire buildings and other sources like natural gas.

Hybrid energy systems are mainly deployed as single solutions, and operated to serve given demand profiles, e.g. Combined-Heat-Power, CHP, and thermal storages, TSS. Subsequently dependent systems are not considered in the operational control. However, the extended operational potential with hybrid energy grids asks for flexibility in grid control in both utilities, operated/optimized grid-specific as well as synchronized on hybrid grid operation scale.

SUMMARY

In an embodiment, the present invention provides a method for controlling energy supply to a client, wherein the client is connected to at least two energy utilities and/or energy grids for receiving energy for operating its energy systems. The method includes providing a demand request signal by at least one operation unit and/or by at least one of the at least two energy utilities and/or energy grids for requesting a demand modification with regard to at least one energy system of the client. A functional entity balances the energy supply to the client, so that a supply of energy from the at least two energy utilities or energy grids to the client is provided under consideration of the demand request signal or signals in a complementary way.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
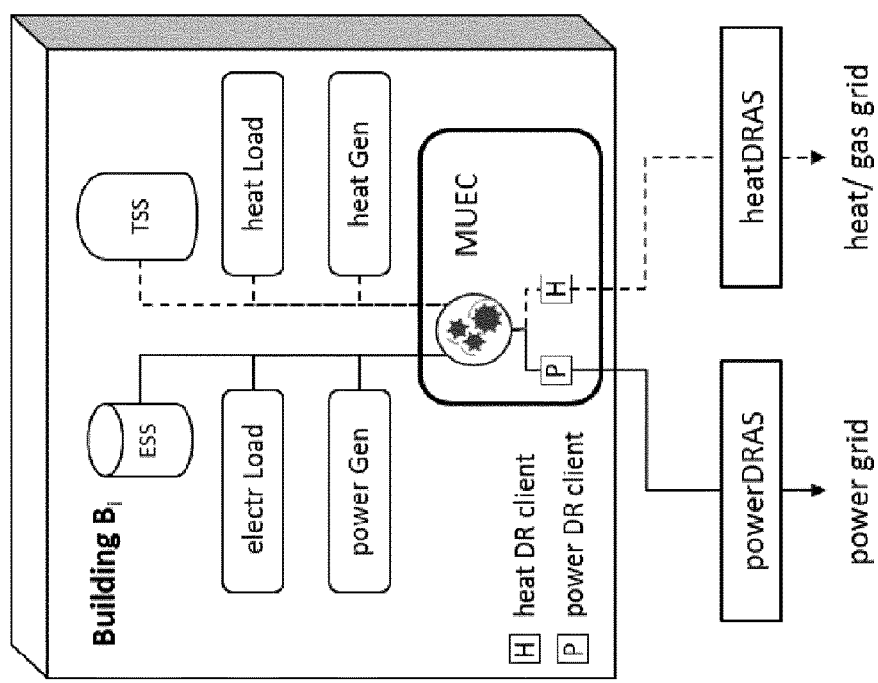
FIG. 1 shows schematically a system for controlling energy supply to a client according to an embodiment of the invention and concretely a Multi Utility Energy Control, MUEC, architecture for a single building.

The present invention relates to a method for controlling energy supply to a client, wherein the client is connected to at least two energy utilities or energy grids for receiving energy for operating its energy systems and wherein a demand request signal is provided by at least one operation unit and/or by at least one of said energy utilities and/or energy grids for requesting a demand modification with regard to at least one energy system of the client. Further, the present invention relates to a system for controlling energy supply to a client, preferably for carrying out the aforementioned method.

Embodiments of the present invention provide methods and systems for controlling energy supply to a client for allowing a reliable energy supply from different energy utilities or energy grids with high efficiency.

According to an embodiment, a method is provided wherein a functional entity is balancing the energy supply to the client, so that a supply of energy from the at least two energy utilities or energy grids to the client is provided under consideration of the demand request signal or signals in a complementary way.

According to an embodiment, a system is provided wherein the energy supply to the client is balanced by a functional entity, so that a supply of energy from the at least two energy utilities or energy grids to the client is provided under consideration of the demand request signal or signals in a complementary way.

According to the invention it has been recognized that it is possible to allow a very reliable and effective energy supply by using or providing a functional entity for balancing the energy supply to the client. Such a functional entity is balancing the energy supply to the client in a manner that a supply of energy from the at least two energy utilities or energy grids to the client is provided under consideration of the demand request signal or signals in a complementary way. For providing a very high efficiency of supply the at least two energy utilities or energy grids provide the energy complementarily. If a first energy utility or energy grid requests a demand reduction or demand increase, the supply of energy from another energy utility or energy grid can be adjusted increased or reduced in a complementary way, so that the demand request for a demand modification by the first energy utility or energy grid is considered. Thus, a reliable energy supply from different energy utilities or energy grids can be provided with high efficiency, wherein the at least two energy utilities or energy grids can be constituted of two energy utilities or of two energy grids or of one energy utility and one energy grid. Different combinations between energy utilities or energy grids are possible for providing the respective complementary energy supply.

Within a preferred embodiment the at least two energy utilities or energy grids can provide different energy forms. One energy utility or energy grid could provide electrical power and another energy utility or energy grid could provide gas. Both energy forms can be used for operating heating systems, e.g. an electric air heating and a gas boiler based static heating. However, other energy forms are also possible for use within the invention.

Within a further preferred embodiment an operation of the functional entity can be in a situation where the supply of energy serves a same or similar end-use purpose. Such an end-use purpose could be the heating of air within a room of a building.

The balancing of the energy supply to the client by the functional entity can be provided and influenced by various constraints and/or influencing variables. Within a preferred situation the balancing can be provided under consideration of one or more constraints of one or more of the energy utilities and/or energy grids and/or operation units. Such constraints can be temporary limitations or excesses in energy generation of one or more energy utilities and/or energy grids. In such situations other energy utilities and/or energy grids could increase or reduce the energy supply. In other situations an operation unit could provide a demand request signal for requesting a demand modification, so that energy supply has to be modified by the functional entity.

Alternatively or additionally the balancing can be provided under consideration of an expected and/or forecasted energetic behaviour of the client, wherein external and/or operational context or circumstances can be addressed. Such a forecast can be based on prior experience and/or on a simulation taking into account information of a so-called Building Information Model, BIM. Various operational data could be obtained by the functional entity from different measurements and measuring points regarding various operational parameters.

Alternatively or additionally the balancing can be provided under consideration of an impact of a demand modification action regarding one energy system of the client on a complementary energy system of the client. This balancing aspect considers the influence of a modified energy system behaviour on the behaviour and constraints of another complementary energy system, e.g. the influence of a static gas-driven heating system on an electric air heating system, wherein the inertia in thermic behaviour has to be considered in time scheduling of operation of the individual systems, for example.

Alternatively or additionally the balancing can be provided under consideration of an impact of a demand modification action regarding one energy system of the client on a thermal behaviour of an environment of this energy system or vice versa. By this criterion the thermal behaviour of an environment of an energy system is considered, e.g. the thermal behaviour of a wall between two rooms of a building. Depending on the wall material different thermal behaviour has to be expected, e.g. various thermal conductivities.

Alternatively or additionally the balancing can be provided under consideration of at least one KPI, Key Performance Indicator, of the client and/or cost function of at least one KPI of the client. Such a KPI could be the so-called Under Performance Time, UPT, defined in the state of the art. This is a time period wherein, for example, a definable temperature range of a room in a building is not reached by a heating process. Normally, such a Under Performance Time should be kept as short as possible. Further preferred a cost function of at least one KPI of the client could be considered, wherein a cost function can be related to real monetary costs, but also to violations of performance KPIs.

Generally, a cost function can be defined or explained as follows: In mathematical optimization, statistics, decision theory and machine learning, a loss function or cost function is a function that maps an event or values of one or more variables onto a real number intuitively representing some "cost" associated with the event. An optimization problem seeks to minimize a loss function. An objective function is either a loss function or its negative—sometimes called a reward function or a utility function—, in which case it is to be maximized. In statistics, typically a loss function is used for parameter estimation, and the event in question is some function of the difference between estimated and true values for an instance of data. Source: Wikipedia http://en.wikipedia.org/.

Within a further preferred embodiment the balancing can comprise evaluating of a constraints setting by received demand request signals from multiple energy utilities or energy grids or operation units. Such a setting can provide an effective basis for the balancing process.

Alternatively or additionally the balancing can comprise applying of preferably cooperative methods to calculate demand modifications under consideration of at least one definable parameter or KPI and to calculate corresponding operation adjustments to the energy systems. Thus, the balancing can comprise in any case the performance of concrete activities for reaching an effective energy supply to a client. Such activities can comprise concrete adjustments of set points of energy systems.

Alternatively or additionally the balancing can comprise integrating a demand modification into energy system planning and forecasting of energy consumption and/or self-supply of the client. Thus, the balancing process can result in an energy system planning of a building, for example, and a corresponding forecasting of energetic behaviour of a building with regard to energy consumption and/or a possible self-supply of the client.

Principally, an operation of the functional entity can be based on at least one controllable energy systems transfer function which is dynamically coupling different energy utilities, energy grids and/or energy forms. Such energy systems transfer functions can be defined as follows: entities and/or states coupling different utility/energy forms. Those entities can be realized either by physical devices, e.g. CHP, or through virtual bundling, e.g. static room heating and electric heater. The respective states are described by adaptations in thermal characteristics, e.g. increase of temperature in office rooms coupled with decrease of cooling energy in adjacent kitchen environment, or e.g. the concept of pre-heating. Such states can also comprise ramping up times of energy systems and/or environment of energy systems, e.g. walls of rooms of a building, which need time for being completely heated to a definable or configurable target temperature.

Within a further preferred embodiment the balancing can comprise a control of an energy management system of the client, e.g. of a building or of buildings which can be aggregated in a building fleet.

With regard to very effective control of energy supply to a client an operation of a functional entity can be performed in real-time. Thus, fast reactions on changing constraints are possible, resulting in very high efficiency of control of energy supply.

Further preferred the functional entity can measure and/or monitor energy relevant parameters of the client for building load profiles, generation profiles and/or storage capacities of the client with regard to its energy situation. Such profiles and/or capacities can be used for effectively balancing the energy supply.

Within a preferred real situation the client can comprise at least one building or a building fleet. However, other situations are possible wherein control of energy supply has to be performed in an effective way.

Within a further preferred situation the at least one operation unit can comprise an energy planning and/or distribution unit. Thus, a demand request signal can be provided by such an energy planning unit and/or a distribution unit. However, other functionalities of the at least one operation unit are possible.

An embodiment of this invention provides a Multi Utility Energy Control management method and system, MUEC, serving different utility grids' constraints by using multiple energy forms and systems. The MUEC can be realized through an energy balancing control method on controllable energy systems transfer functions coupling different utility/energy forms for controlling the energy usage in/across different building subsystems. This method can make use of energy forecast methods addressing external and operational context to impact control of energy systems transfer functions as well as cost functions for building KPIs to impact control of energy systems transfer functions to fulfil external utility grid constraints requests given by e.g. Demand-Response signals of infrastructure capacity limitations.

Embodiments of the invention provide that future DR approaches are not limited to electricity grids only, but can actively operate DR programs in adjacent utility grids or energy utilities. Thus, an integration of DRs from different energy utilities or energy grids or operation units is possible.

Based on this integration a provision of an in-building or in-building-fleet operational strategy is possible to serve these DR requests individually to the advantage of the energy utilities or energy grids or operation units as well as the building or buildings.

This invention can provide a Multi Utility Energy Control system serving single buildings as well as aggregated buildings in a building fleet.

Embodiments of the present invention can provide one or more of the following features:

1) Energy balancing control method for adjusting controllable energy systems transfer functions coupling different utility/energy forms for controlling the energy usage in/across different building subsystems. Using energy forecast methods addressing external and operational context to impact control of energy systems transfer functions. Using building KPIs and respective cost functions to determine the utilization of energy systems transfer functions to fulfill external DR requests.

2) Balancing complementary energy systems against multiple Demand Response signals—preferably from independent energy utility or energy grid or operation unit operations for one energy source while explicitly considering the balancing effects in a complementary—energy system. Embodiments of the invention provide a system and method for balancing complementary energy systems' Demand Response signals, comprising the steps of: Forecasting energetic behaviour of building systems, Assessing impacts of demand reduction actions on complementary energy systems, and Integration in cooperative energy planning of multiple energy systems in building.

An MUEC can enable a wider scope to adjust to energy constraints, take into account energy constraints/DR concerns of multiple utility grids, gain flexibility to participate in multiple DR programs, integrates DR into dynamic energy planning for the buildings.

An MUEC can support the cooperation of utility grids by informing complementary grids of energetic implications of another grid's demand response actions.

An MUEC can also be utilized for building-internal energy constraints management against over-supply or under-supply, e.g. through energy cost management or utilization of self-supply.

It has to be noted that the use of the term "DR" within this document also comprises the term "demand request", so that the term "demand request" can replace the term "DR" or "Demand Response" in a generalizing way.

The following abbreviations are used within this document:

BEMS Building Energy Management System
DR Demand Response
DRAS DR Application Server
MUEC Multi Utility Energy Control
ESS Electric Energy Storage System
TSS Thermal Energy Storage system Various embodiments of the invention provide a Multi Utility Energy Control management method and system, MUEC, serving different utility grids' constraints, e.g. through DR requests, physical capacity limitations of generation and infrastructure, with the respective grids attached to buildings hosting multiple energy forms and systems. The MUEC is realized by controllable energy systems transfer functions dynamically coupling different utility/energy forms.

This invention can apply to buildings which are connected to at least two or more energy grids or energy utilities. These energy grids can be owned by the same or different providers. As a boundary condition, the MUEC applies to situations where the multitude of energy use is interworking serving same or similar end-use purpose, e.g. complementary methods for heating like electric air heating and gas boiler based static heating.

FIG. 1 presents a typical buildings design, exemplified for the coexistence of electricity and heating systems served via electricity and heat/gas grid for a single building, however, with a control system according to the invention.

An embodiment of the MUEC application is providing a method and system in order to balance demand requests from independently operated, multiple energy utilities through cooperative operation across buildings energy systems by: evaluating constraints setting by received DR requests from electricity grid as well as heating grid, applying cooperative methods to calculate the acceptable DR request adjustments to the requesting energy grid and the operation adjustments to the building internal energy systems—energy □E, power □P—, and integrating the modifications to energy system planning and forecasting of energy consumption/self-supply of the building.

Figure 2:
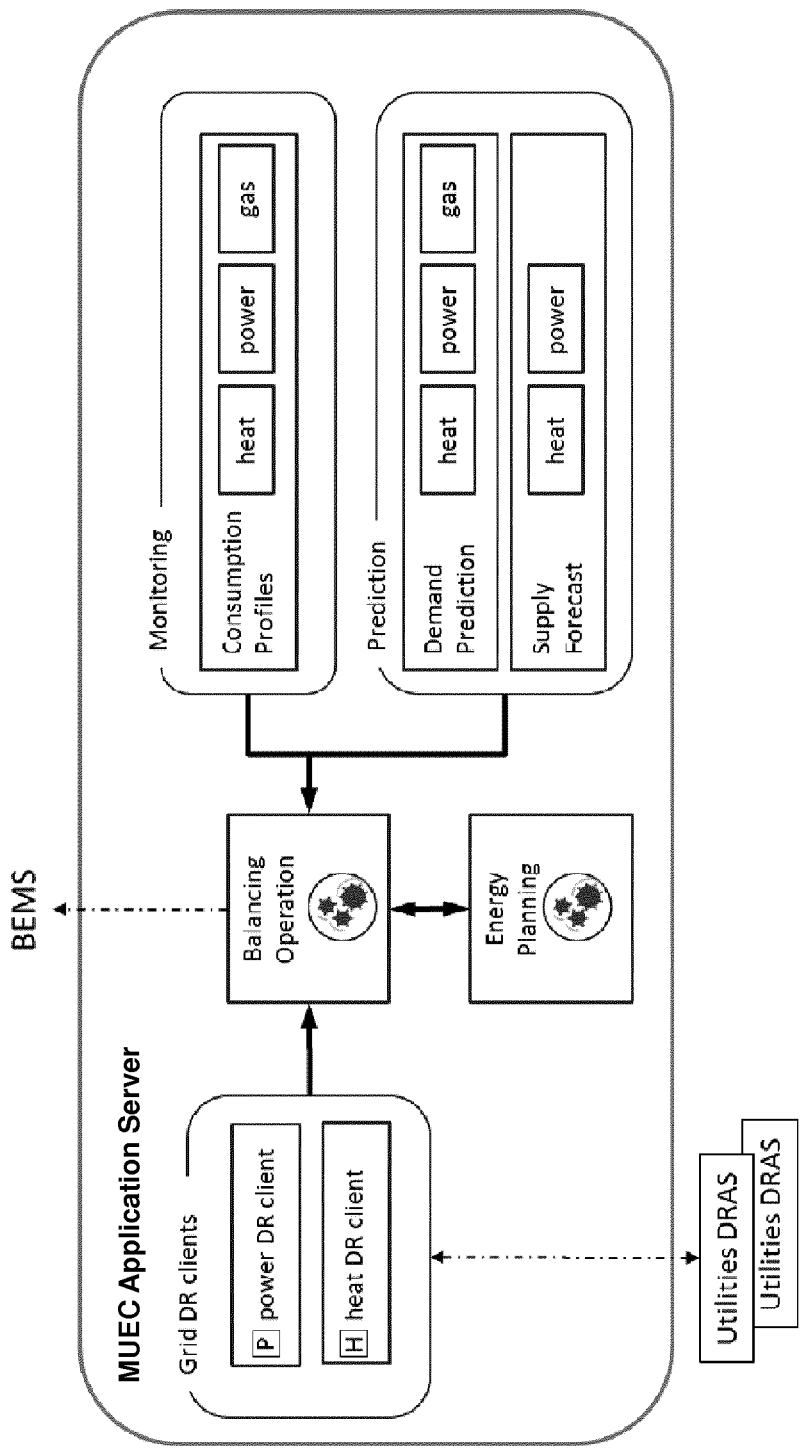
FIG. 2 shows schematically an embodiment of an MUEC application server with its high-level component architecture.

The MUEC application server consists of an intelligent MUEC engine component that controls the building's EMS, energy management system, and negotiates DR signals with aforementioned two or more energy grids' DR infrastructure over the respective DR clients here: electricity DR client and heat DR client. FIG. 2 shows a typical component architecture of a MUEC application server according to the invention.

For each utility domain, the information required to build load profiles, generation profiles and storage capacities is measured and monitored within the building.

Further, MUEC is configured with information about "couplings", i.e. information about which building systems will be affected by DR signals in one energy grid or energy utility or operation unit. In one embodiment, the information about couplings is derived from a so-called Building Information Model, BIM, source: http://www.buildingsmart.de/.

In a beneficial embodiment, coupling effects are expressed by energy systems transfer functions where the reductions in energy—or the respective adjusted setpoints—of one system are transferred into effects on energy or set-point adjustments in coupled system or systems. These transfer functions will respect the different ramping and response time scales, e.g. electricity—below second, heating—in range of minutes and hours, in order to deploy effective measures. The MUEC will derive with a set of re-configurations for all units needed to balance the energy usage between the grids and to still reach the targeted goals, e.g. comfort, to the best possible cost function, e.g. comfort-related KPIs like Under Performance Time, UPT, to minimum, and initiate the actuation of the set points. The following example shows a simplified execution:

Case within a soccer stadium: low ambient temperatures outside over day will cause a too strong grass field temperature drop below optimal operational temperature bands. An increase of heating capacities from heating grid is not possible, as the constraints for heating grid demands to keep heating energy amount stable or minimize up to noon time.→MUEC needs to consider an energy usage from another energy form to overcome the expected lack of comfort. Office areas have optional heating systems: including electricity-based system→Through forecast and thermal inertia of the grass field and office rooms, MUEC calculates the possible heat-up time using different supply temperatures for the grass field over the period of working hours, +/−2 hours, and replaces the needed pre-heating for the office area from static heating to electricity-based heat devices. This mode is also kept for some portion during working hours before turning to standard static heating in the offices. The aim is to fulfill the requirements to minimize the under-performance-times, UPT, to zero for both building subsystems.

The actuation to either of the utility grids could be scheduled as follows: Electricity grid: (i) set room temperature targets 2 hours earlier than work hour settings, (ii) actuate the energy usage of the local electricity-based heaters to ON and the respective electricity settings to reach target comfort at working day start. (iii) Actuate electricity settings to hold the comfort KPI setting. (iv) Actuate electricity usage to OFF after 2 hours after working start, with switch to static heating of office area. Heating grid: (i) Keep grass heating ON with increasing the supply temperature for grass heating up from 2 hours before and for 2 hours after working hours start—together 4 hours to enable a lengthened heating—up period for morning time. (ii) Switch OFF grass heating, switch ON static heating for office area.

As result, the UPT for the grass field operation over whole working day is decreased as the field is not reaching below desired temperature bands, and the UPT for the office comfort is minimized as desired room temperature is guaranteed at work start and with calculated switch over between electricity-provided and heat-grid provided thermal energy to avoid any gaps.

Figure 3:
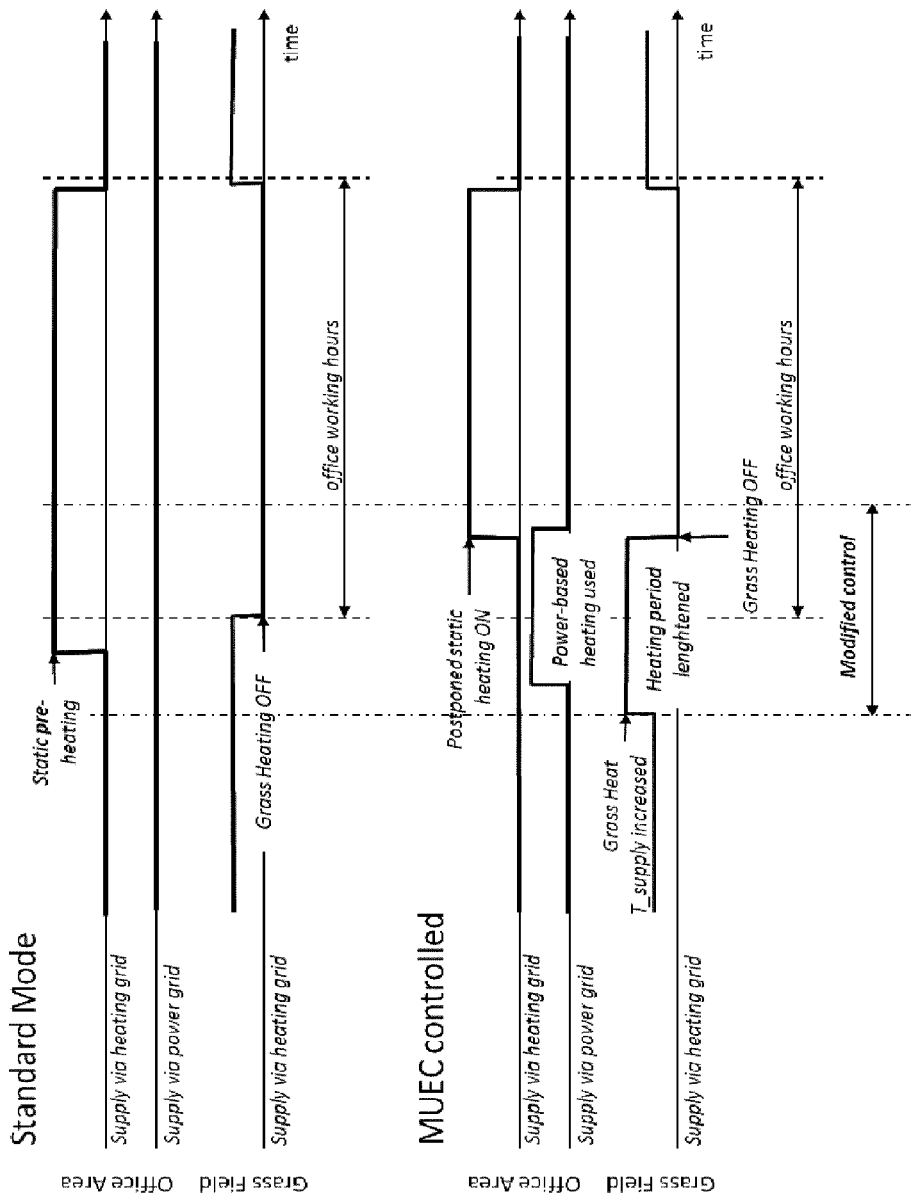
FIG. 3 shows in a diagram an embodiment of a time scheme within a control case.

A sample scheme for time-wise actuation for the outlined example is given in FIG. 3.

In a beneficial embodiment, when receiving DR signals to reduce energy from one of the utilities it is connected to, the MUEC employs forecasts of its building's energetic behaviour in respect to the specific energy form. These forecasts can stem from a variety of sources, e.g. from a machine learning module, pre-configured daily consumption patterns, or regression models.

In a beneficial embodiment, the MUEC will take into account the integration of effects across both grids. When a DR signal is too demanding, in contrast to rejecting or negotiating lower values as in the today's State of the Art for electricity—DR, the MUEC will investigate via its forecasting mechanism if it can further reduce energy in the requesting energy grid and time frame by cooperating between complementary utility systems. For example, the MUEC will balance between the electricity-driven HVAC units and the heating-system driven static heating to serve given comfort levels in office rooms. For this it may choose to increase or decrease set-points in both building systems accordingly. Therefore, in this beneficial embodiment, the MUEC forecasts the building systems' energetic behaviours in different scenarios of set-point settings.

Figure 4:
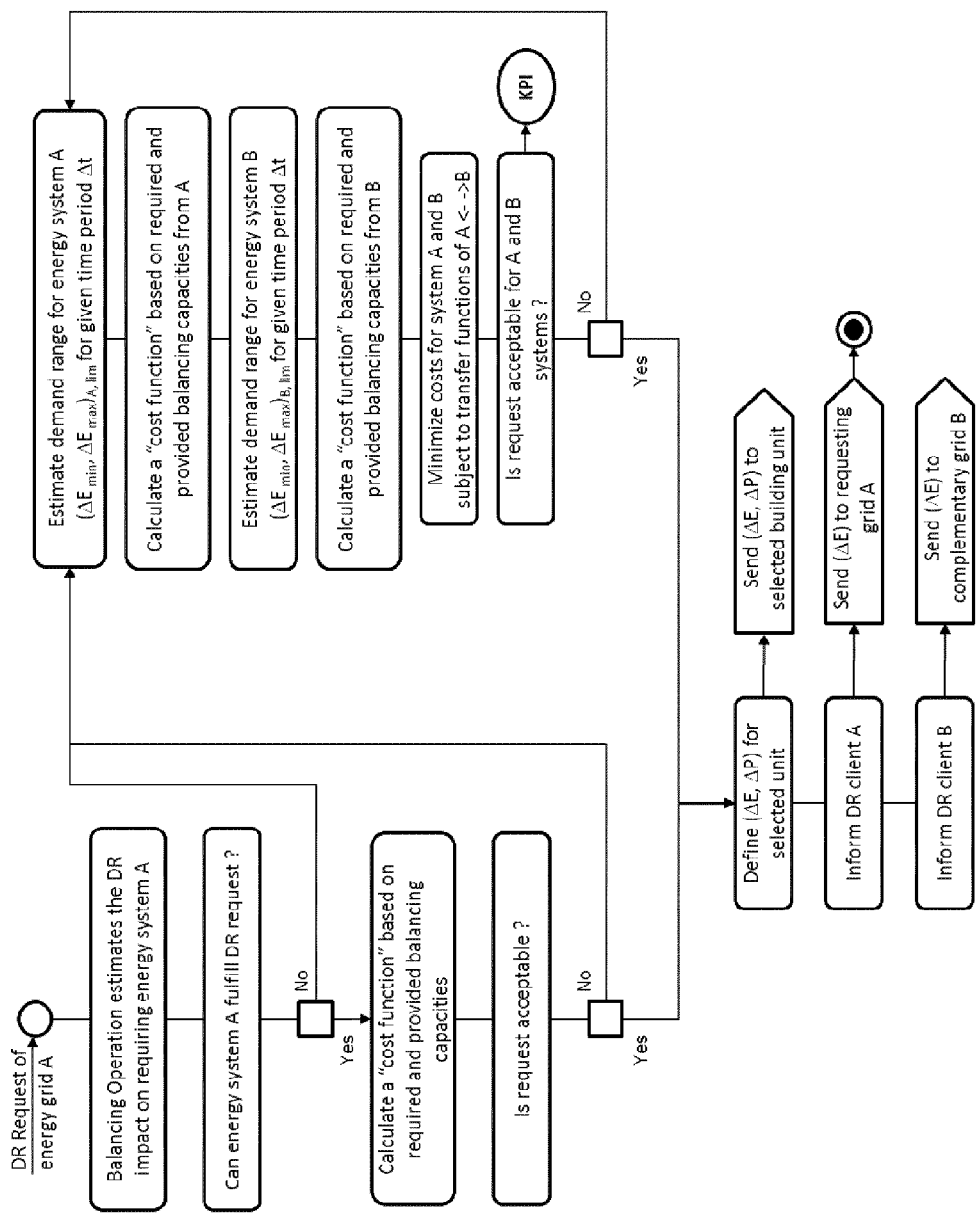
FIG. 4 shows an embodiment of a process flow for an MUEC management method receiving a demand request from an energy grid A according to an embodiment of the invention.

In a beneficial embodiment, the MUEC is able to calculate the monetary implications of balancing the complementary energy grids. It will avoid balancing complementary energy systems if the monetary incentive is below a configurable threshold. A typical process flow is sketched in FIG. 4.

Figure 5:
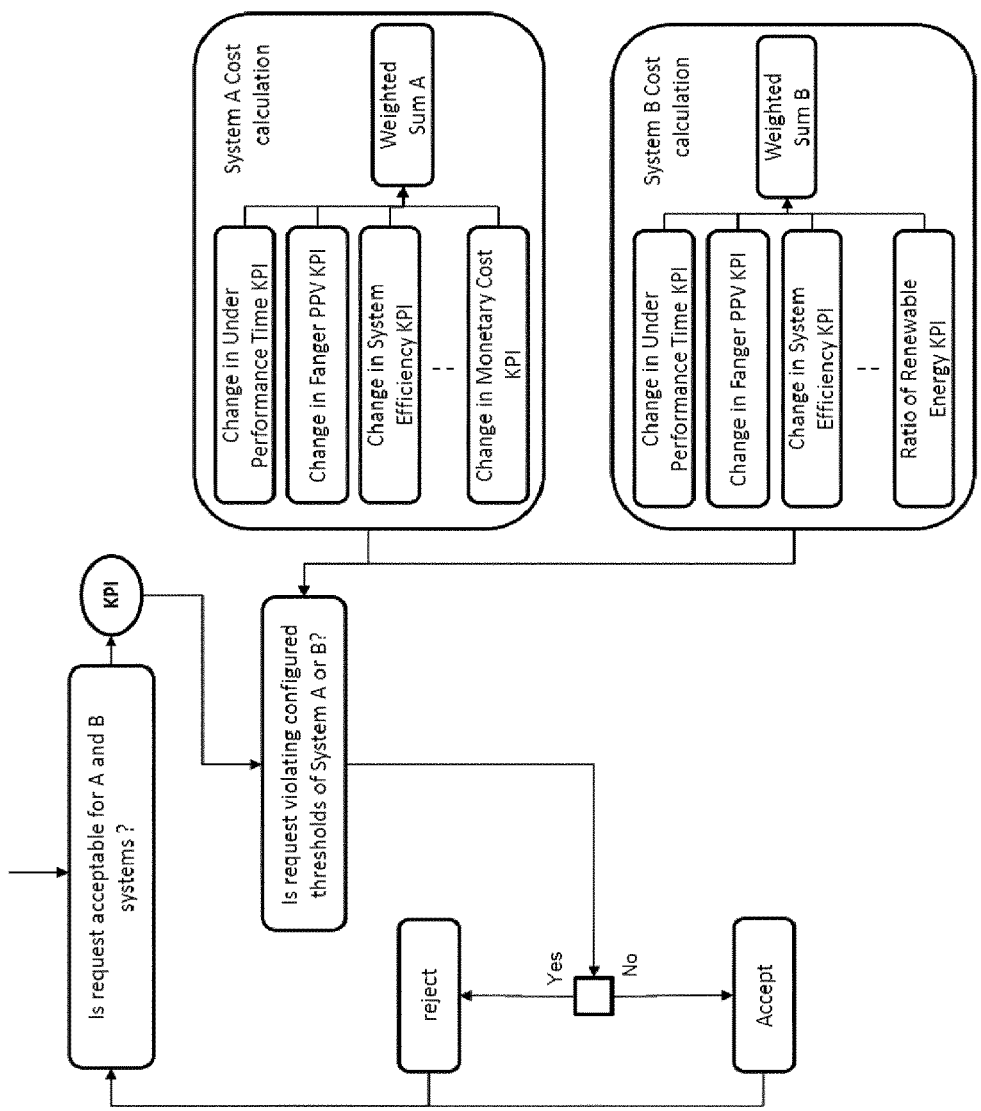
FIG. 5 shows an embodiment of a process flow of a system specific multi-KPI cost function according to an embodiment of the invention.

In a beneficial embodiment, the MUEC is able to calculate the implications of balancing the complementary energy grids with respect to comfort indicators or other Key Performance Indicator, KPI, measures such as the so-called Under Performance Time defined in the state of the art. It will avoid balancing complementary energy systems if the—configurable—thresholds of the respective KPI measures are violated. In an extension of this embodiment, multiple KPIs are combined in a cost function where each KPI is weighted by a configurable weight. If this multi KPI cost violates a configurable threshold, MUEC will avoid a specific balancing scenario. In a further variation, the different systems' cost functions are using different weights, KPIs and thresholds such as indicated exemplarily in FIG. 5. The following Table provides examples for typical KPIs applicable for buildings and buildings components like rooms and/or equipment.

| KPI | Parameters/Comments |
| --- | --- |
| | COMFORT LEVEL and Quality of Service |
| UPT | Underperformance Time - parameter indicating the ratio of underperformance time to the total opening building hours. Target is UPT = (opening − underperforming time)/opening time = 1. |
| UPR | Underperformance Ratio - parameter indicating the ratio of spaces which have not been serviced with the requested quality parameter. Target is UPR = (total number of spaces − underperformed space)/total number of spaces = 1. |
| UPP | Proportional underperformance - parameter of underperformance in spaces related to a specific using organization. Target is UPP = (total number of spaces of organization − underperformed space of organization)/total number of spaces of organization = 1. |
| UPI | Underperformance index - parameter of underperformance in spaces related to a serving subsystem. Target UPI = 1. |
| PMV/PPD | Predicted Percentage of Dissatisfied - quantitative measure of service thermal comfort to a group of people at a particular thermal environment. Predicted Mean Vote - same meaning with factor to PPD. |
| SQ | Service quality - is a measure to represent PMV values on a scale of 0 to 1. |
| $\rho_{occup}$ | Occupant density of a space |
| OD | Occupant density category OD = f ($\rho_{occup}$) |
| $W_{in,gr,gas}$ | Gas intake |
| $W_{in,gr,gas}$ | Electricity intake |
| GF | Green Factor - indicates the ration between micro and co-generated energy and purchased energy. |
| $CO_2$ | Energy usage translated in equivalent $CO_2$ emissions |

In a variation, MUEC provides an additional bi-directional communication channel to complementary utilities DRAS entities, so that MUEC is able to inform the effects of its decisions on the complementary energy grid to said complementary energy grid prior to accepting the DR signal and applying the necessary actuations in the balancing. In case the complementary grid would suffer from these decisions, the utility could reject the proposal, resulting in a situation where the MUEC accepts only DR actions as much as possible without impacting the complementary energy grid.

In a beneficial embodiment standard OpenADR—source: http://www.openadr.org/—is used for all DR communication channels. In a variation, the two or more OpenADR connections of the MUEC to the two or more grids could be replaced by an enhanced protocol, in case a single utility owns both grids. In this case multiple different energy forms and demand response negotiations could be carried in an extended version of OpenADR.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for controlling energy supplied, by at least two energy providers, to a client for the purposes of controlling a temperature of at least a first volume, the method comprising:
  receiving, from a first energy provider of the at least two energy providers, a demand request signal requesting a modification of energy demanded, for a first energy system of the client, by the client from the first energy provider; and
  balancing, according to a desired temperature for the first volume, the demand request signal received from the first energy provider, and a constraint of a second energy provider of the at least two energy providers, the energy supplied, by the at least two energy providers, to the client,
  wherein the balancing the energy supplied to the client includes taking into account inertia in the thermal behavior of the first volume.

2. The method according to claim 1, wherein the first energy provider and the second energy provider provide different forms of energy.

3. The method according to claim 1, wherein energy provided by the first energy provider and energy provided by the second energy provider serve a same end-use purpose.

4. The method according to claim 1, wherein the balancing the energy supplied to the client further includes taking into account an expected and/or forecasted energetic behavior of the client addressing external and/or operational context or circumstances.

5. The method according to claim 1, wherein the balancing the energy supplied to the client further includes determining an impact of the modification of energy demanded by the client from the first energy provider on a second energy system of the client that is complementary to the first energy system of the client.

6. The method according to claim 1, wherein the balancing the energy supplied to the client further includes determining an impact of the modification of energy demanded by the client from the first energy provider on a thermal behavior of an environment of the first energy system of the client, and
wherein the inertia in the thermal behavior of the first volume is determined based on the thermal behavior of the environment of the first energy system of the client and the impact of the modification of energy demanded by the client from the first energy provider on the thermal behavior of the environment of the first energy system of the client.

7. The method according to claim 6, wherein the inertia in the thermal behavior of the first volume is determined further based on a thermal conductivity of a barrier between the first volume and a second volume external to the first volume.

8. The method according to claim 1, wherein the balancing the energy supplied to the client further includes considering at least one Key Performance Indicator (KPI) of the client and/or a cost function of the at least one KPI of the client.

9. The method according to claim 1, wherein the balancing the energy supplied to the client further includes applying cooperative methods to calculate demand modifications while taking at least one definable parameter or key performance indicator (KPI) into consideration and to calculate corresponding operation adjustments to the first energy system of the client.

10. The method according to claim 1, wherein the balancing the energy supplied to the client is performed based additionally on at least one controllable energy systems transfer function that dynamically couples energy provided by the first energy provider and energy provided by the second energy provider.

11. The method according to claim 1, wherein the balancing the energy supplied to the client is performed by controlling an energy management system of the client.

12. The method according to claim 1, wherein the balancing the energy supplied to the client is performed in real-time.

13. The method according to claim 1, further comprising measuring and/or monitoring energy relevant parameters of the client in order to build at least one of load profiles, generation profiles, and storage capacity profiles of the client.

14. The method according to claim 1, wherein the client comprises at least one building, and/or
wherein the at least two energy providers each includes an energy planning unit and/or a distribution unit.

15. The method according to claim 1, wherein the balancing the energy supplied to the client further includes integrating the modification of energy demanded, for a first energy system of the client, by the client from the first energy provider into energy system planning and forecasting of energy consumption and/or self-supply of the client.

16. The method according to claim 1, wherein the balancing the energy supplied to the client includes:
determining a proposal for balancing the energy supplied to the client, and
informing the second energy provider, via a bidirectional communication channel, of the proposal for balancing the energy supplied to the client.

17. The method according to claim 16, wherein the balancing the energy supplied to the client further includes:
receiving, from the second energy provider via the bidirectional communication channel, a response to the proposal for balancing the energy supplied to the client, and
if the response received from the second energy provider rejects the proposal for balancing the energy supplied to the client, balancing, according to the demand request signal received from the first energy provider, the energy supplied to the client only as much as possible without impacting the second energy provider.

18. The method according to claim 1, wherein the balancing the energy supplied to the client includes:
calculating, based on the demand request signal received from the first energy provider and the constraint of the second energy provider, adjustments to the first energy system of the client.

19. The method according to claim 18, wherein the adjustments to the first energy system of the client include an energy adjustment and/or a power adjustment.

20. A system for controlling energy supplied to a client by at least two energy providers for controlling the temperature of at least a first controlled volume, the system comprising:
a first energy provider configured to supply a demand request signal requesting a modification of energy demanded, for a first energy system of the client, by the client from the first energy provider;
a second energy provider; and
a controller of the client configured to balance, according to a desired temperature for the first volume, the demand request signal received from the first energy provider and a constraint of the second energy provider, the energy supplied, by the at least two energy providers, to the client,
wherein the controller of the client is configured to balance the energy supplied to the client by taking into account inertia in the thermal behavior of the first volume.

* * * * *